United States Patent [19]

Scheuneman

[11] 4,112,502
[45] * Sep. 5, 1978

[54] CONDITIONAL BYPASS OF ERROR CORRECTION FOR DUAL MEMORY ACCESS TIME SELECTION

[75] Inventor: James Herman Scheuneman, St. Paul, Minn.

[73] Assignee: Sperry Rand Corporation, New York, N.Y.

[ * ] Notice: The portion of the term of this patent subsequent to Nov. 15, 1994, has been disclaimed.

[21] Appl. No.: 817,081

[22] Filed: Jul. 18, 1977

Related U.S. Application Data

[62] Division of Ser. No. 733,687, Oct. 18, 1976, Pat. No. 4,058,851.

[51] Int. Cl.² .................. G06F 11/10; G06F 13/00; G06F 11/00; G06F 1/04
[52] U.S. Cl. ............................ 364/900; 235/312
[58] Field of Search ... 364/200 MS File, 900 MS File, 364/312, 303.3; 365/200

Primary Examiner—James D. Thomas
Attorney, Agent, or Firm—Kenneth T. Grace; William E. Cleaver; Marshall M. Truex

[57] ABSTRACT

A method of and an apparatus for conditionally bypassing the error correction function of a large scale integrated (LSI) semiconductor random access memory (RAM) is disclosed. A content addressable memory (CAM) is utilized to store the addresses of the addressable locations in the RAM in which an error was previously detected, and on each memory reference both the CAM and the RAM are simultaneously referenced by the same address. Upon a memory reference, the read data from, i.e., the date read out of, the RAM is concurrently coupled directly to an Interface Register and directly to the error detection and correction circuitry (ECC) and thence to the Interface Register. If the CAM does not contain the address, the read data that is coupled to the Interface Register is gated out at a first relatively early gate pulse. However, if the CAM does contain the address, the corrected read data from the ECC is then gated out of the Interface Register at a second relatively later gate pulse. Thus, when no error exists in the read data, the RAM is accessed at a relatively fast access time while, if an error exists in the read data, the RAM is accessed at a relatively slower access time to provide the added time required by the ECC to correct the read data.

3 Claims, 11 Drawing Figures

Fig. 1

Fig. 2d CORRECTABLE ERROR, NO MATCH

CONDITIONAL BYPASS OF ERROR CORRECTION FOR DUAL MEMORY ACCESS TIME SELECTION

This is a division of application Ser. No. 733,687, filed Oct. 18, 1976, now U.S. Pat. No. 4,058,851.

BACKGROUND OF THE INVENTION

In the prior art, it is known that LSI semiconductor memories may provide erroneous data upon read out of the information stored therein. Such errors in the read data may be occasioned by defective memory cells in which the defective memory cell unconditionally provides, as an output therefrom, a signal indicative of the storage of a e.g., 0, therein, while, alternatively, such errors in the read data may be random errors due to electronic perturbations during write in or read out. Accordingly, many techniques have been devised by electronic data processing engineers to overcome the effect of errors in read data upon the operation of the associated data processing system, and, particularly the LSI memory with which the errors are associated. In the J. L. Brown, et al, U.S. Pat. No. 3,800,286, there is disclosed a system wherein a CAM is searched for an address. If the address is not available in the CAM, the main memory is referenced; if the address is available in the CAM, the CAM associated buffer memory is referenced. In the J. A. Weisbecker, U.S. Pat. No. 3,234,521, there is disclosed a system wherein a CAM is searched for an address. If the address is stored in the CAM, indicating a defective address in main memory, the CAM produces a substitute address in main memory that is then referenced in main memory. Also there is provided a change in regular main memory timing to allow for the additional time required to reference the main memory at the substitute address. Still further, in the H. A. Perkins, Jr., U.S. Pat. No. 3,331,058, there is disclosed a memory with regular data positions and stored data positions, which substitute for defective regular data positions, that is utilized by an address decoder to store data in a stored data position at the address of the regular data position that is defective. The present invention is considered to be an improvement invention over these other known prior art memory systems.

SUMMARY OF THE INVENTION

The memory system of the present invention utilizes a RAM and a CAM in which are stored the addresses of the addressable locations in the RAM in which an error has been previously detected by the RAM associated ECC. On each memory (RAM) reference, both the RAM and CAM are simultaneously addressed by the RAM address that is coupled to the memory address register by the Requestor that is granted priority. Upon a memory reference, the uncorrected read data from the RAM is concurrently coupled directly to the Interface Register and to the ECC and the corrected read data is then coupled to the Interface Register. If upon the memory reference the CAM does not contain the address, the uncorrected read data that is coupled to the Interface Register from the RAM is gated out of the Interface Register to the Requestor at a first relatively early gate pulse defining memory access time. However, if the CAM does contain the address, the corrected read data from the ECC is then gated out of the Interface Register to the Requestor at a second relatively later gate pulse defining memory access time. The ECC, upon the detection of a correctable error in the read data, and the CAM, upon the determination that the addressable location in the RAM is not stored in the CAM, combine to generate a Retry signal that is, in turn, coupled to the Requestor. Also at this time, the address of the addressable location in the RAM in which the error was detected by the ECC is then stored in the CAM. The Requestor, in response to the Retry signal, ignores the erroneous uncorrected read data it receives from the Interface Register and initiates another memory reference using the same address. Upon the second try of the readout of the addressed data, the ECC corrects the read data and the corrected read data is then coupled to the Interface Register and thence to the Requestor.

DESCRIPTION OF THE PREFERRED EMBODIMENT

Figure 1:
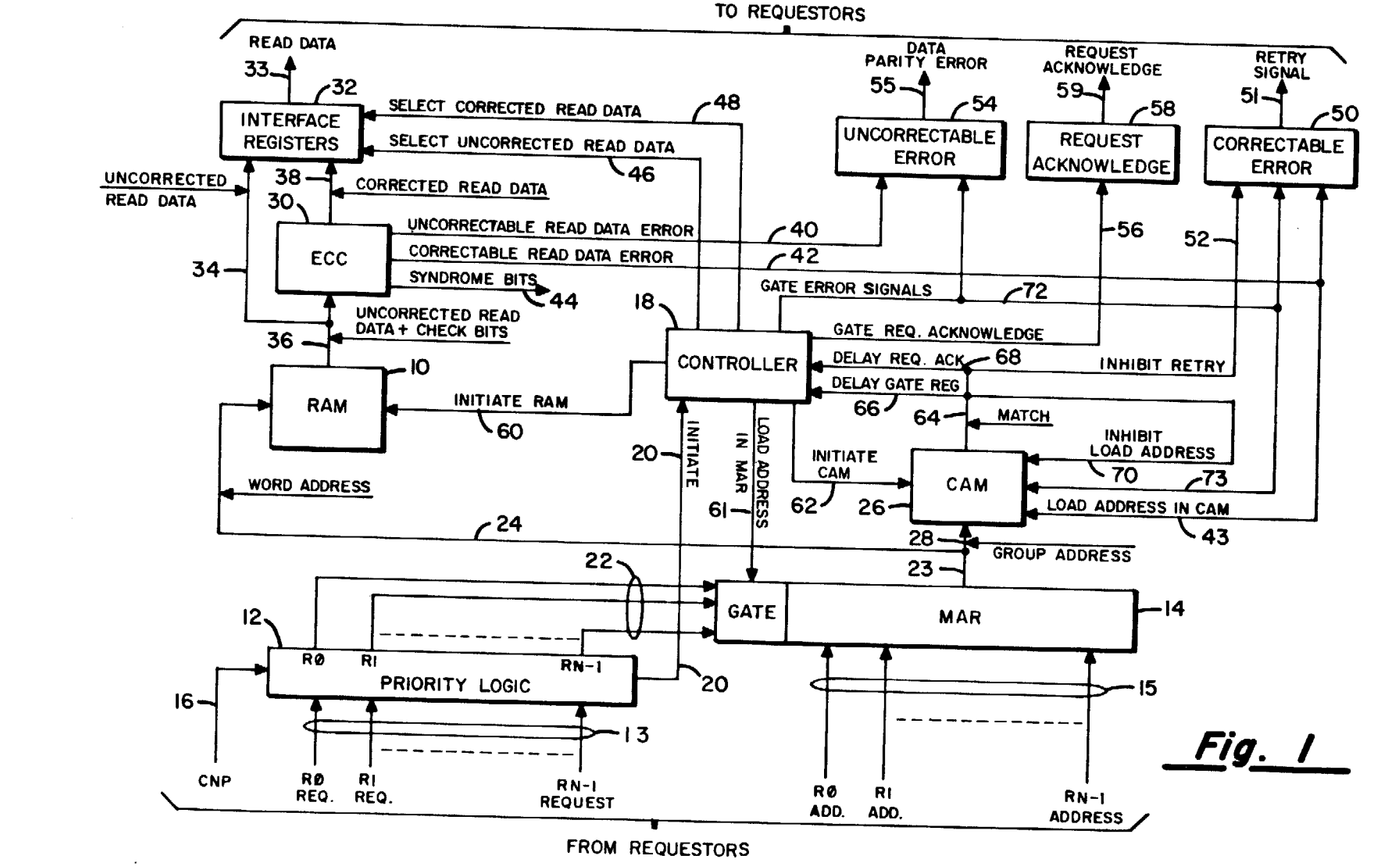
FIG. 1 is a block diagram of a memory system incorporating the present invention.

With particular reference to FIGS. 1, 2a, 2b, 2c, 2d, 2e and 2f and 3 there are presented a block diagram of a memory system incorporating the present invention, timing diagrams of typical operations thereof and a flow diagram of a functional description of the typical operation thereof, respectively. In the electronic data processing system into which the memory system of FIG. 1 is included, there are utilized a plurality of, e.g., N=8, Requestors R0-R7. All Requestors R0-R7, via their associated Priority Request signal may simultaneously request access to the associated main Random Access Memory (RAM) 10 for which a conflict of requests would be realized. Accordingly, in such an electronic data processing system the Requestors, which are assigned different numerical priority ratings, couple their Priority Request signals to priority determination logic. Priority Logic 12 determines which one of the up to, e.g., 8, Requestors R0-R7 that may be simultaneously requesting access to the associated RAM 10 is to be granted priority. More advanced priority systems may provide rotational priority between Requestors based upon the accumulated priority history — see the M. Danilenko U.S. Pat. application Ser. No. 550,800, filed Feb. 18, 1975, now U.S. Pat. No. 4,009,470.

In the embodiment of FIG. 1, each of the Requestors R0-R7, when requesting access to RAM 10, concurrently couples to Priority Logic 12 via cable 13 its associated Priority Request signal and couples, to Memory Address Register (MAR) 14, via cable 15, its associated address of the addressable location in RAM 10 to which it seeks access.

At given times, usually determined by the receipt of a Priority Request signal on cable 13 from a Requestor or by internal RAM 10 timing, Priority Logic 12 is affected by a Clock New Priority (CNP) signal, as on line 16. The CNP signal gates into Priority Logic 12 all Priority Request signals coupled thereto at that (CNP) time. Priority Logic 12 then determines which one of the up to 8 Priority Request signals, from the associated Requestors R0-R7, is to be granted priority. Priority Logic 12 then generates an Initiate signal, which Initiate signal initiates memory access timing via line 20 and Controller 18, and also couples to MAR 14 the decoded output of Priority Logic 12 via the one activated line of cable 22. The one activated line of cable 22 enables MAR 14 to accept the address that is associated with the one Requestor that has been granted priority by Priority Logic 12. This address, from MAR 14, is then concurrently coupled to RAM 10, via cable 24, and to Content Addressable Memory (CAM) 26 via cable 28.

The Requestor address from MAR 14 that is coupled to both RAM 10 and CAM 26 may be of the same multibit word length; however, in that condition CAM 26 might be required to have the same number of addressable locations as does the RAM 10. This, of course, would result in a CAM 26 of an unwieldy large size. Alternatively, CAM 26 could be of a predetermined size of a substantially lesser number of content addressable locations to function as an error logging store of minimum capacity such as that of my U.S. Pat. No. 3,917,933. In the preferred embodiment of the present invention such a technique is utilized to isolate correctable errors in RAM 10 at the word group address level.

Figure 4:
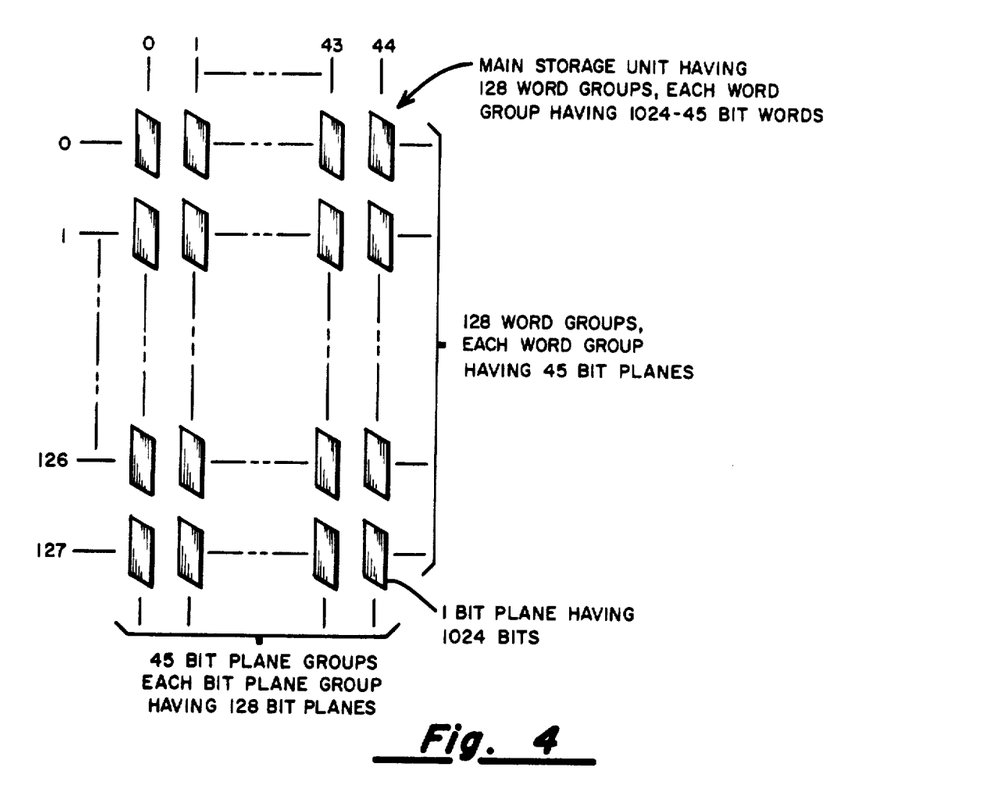
FIG. 4 is an illustration of how the replaceable 1,024 bit planes are configured in the RAM of FIG. 1.

RAM 10 is of a well-known design configured according to FIG. 4. RAM 10 is an LSI semiconductor memory having, e.g., 131K words each of 45 bits in length containing 38 data bits and 7 check bits. RAM 10 is organized into 128 word groups, each word group having 45 bit planes, each bit plane being a large scale integrated (LSI) plane of 1,024 bits or memory locations. The like-ordered bit planes of each of the 128 word groups are also configured into 45 bit plane groups, each of 128 bit planes. Addressing of RAM 10 is by concurrently selecting one out of the 128 word groups and one like-ordered bit out of the 1,024 bits of each of the 45 bit planes in the one selected word group. This causes the simultaneous readout, i.e., in parallel, of the 45 like-ordered bits that constitute the one selected or addressed word that is stored in the addressed addressable location.

Figure 5:
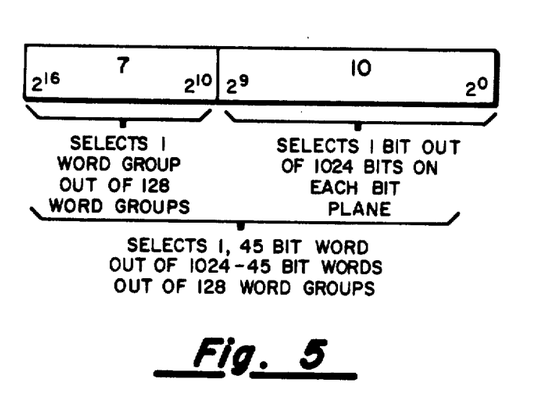
FIG. 5 is an illustration of the format of an address word that is utilized to address an addressable location in the RAM of FIG. 1.

With particular reference to FIG. 5 there is illustrated the format of an address word that is utilized to select or address one word out of the 131K words that are stored in RAM 10. In this configuration of the address word, the higher-ordered 7 bits, $2^{16}$-$2^{10}$, according to the 1's or 0's in the respective bit locations $2^{16}$-$2^{10}$, select or address one word group out of the 128 word groups while the lower-ordered 10 bits $2^9$-$2^0$, select or address one bit out of the 1,024 bits on each of the 45 bit planes in the word group that is selected by the higher-ordered bits $2^{16}$-$2^{10}$.

RAM 10 utilizes a double error detection and single error correction circuit (ECC) 30 — see the publication "Error Detecting and Correcting Codes," R. W. Hamming, The Bell System Journal, Volume XXVI, April 1950, No. 2, pages 147-160 — for the detection and correction of single bit errors in each of the 45 bit words that are stored therein. MAR 14 is the Memory Address Register that accepts and stores the address word of the format of FIG. 5 as coupled thereto by the respectively associated requestor, for addressing or selecting one out of the 131K 45 bit words that are stored in RAM 10.

Figure 6:
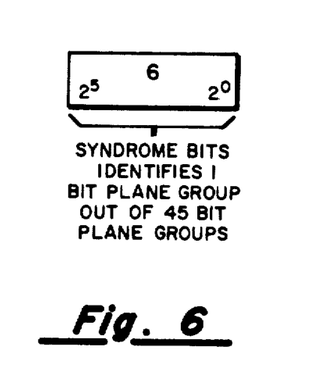
FIG. 6 is an illustration of the format of the syndrome bits generated by the ECC of FIG. 1.

RAM 10, upon the selection of the read data that is stored in the addressable location that is defined by the address held in MAR 14, couples, in parallel, the uncorrected read data to Interface Register 32 via cable 34 and to ECC 30 the uncorrected read data plus the associated check bits via cable 36. ECC 30 operates upon the uncorrected read data plus the associated check bits for the detection of errors, and if a correctable, i.e., a single bit, error is detected, corrects such error and then couples, via cable 38, the corrected read data to Interface Register 32. ECC 30, while correcting any correctable error in the one word addressed in RAM 10, also generates:

a signal on line 40 denoting the detection of an uncorrectable error;
a signal on line 42 denoting the detection of a correctable error; and,
on cable 44, 6 syndrome bits that identify the 1 bit plane group that contains the defective bit out of the 45 bit plane groups in which RAM 10 is configured as previously discussed with particular reference to FIG. 4. The 6 syndrome bits generated by ECC 30 are configured as illustrated in FIG. 6.

As stated above, on each memory (RAM) 10 reference, both RAM 10 and CAM 26 are simultaneously addressed by the RAM address that is coupled to MAR 14 by the Requestor that is granted priority by Priority Logic 12. Upon a memory reference, the uncorrected read data from RAM 10 is concurrently coupled directly to Interface Register 32 and also directly to ECC 30 and thence (the corrected read data if correctable) to Interface Register 32. If upon the memory reference CAM 26 does not contain the RAM address, the uncorrected read data that is coupled to Interface Register 32 is gated into and out of Interface Register 32 via cable 33 to the Requestor at a first relatively early gate pulse defining memory access time via Controller 18 and a Select Uncorrected Read Data signal on line 46. However, if CAM 26 does contain the RAM address, the corrected read data from ECC 30 is then gated into and out of Interface Register 32 to the Requestor at a second relatively later gate pulse defining memory access time via Controller 18 and a Select Corrected Read Data signal on line 48.

ECC 30, upon the detection of a correctable error in the uncorrected read data and the Correctable Read Data Error signal on line 42, and CAM 26, upon the determination that the addressed addressable location in RAM 10 is not stored in CAM 26 and a no match or Match signal on line 52, combine to generate, at Retry Signal Generator 50, a Retry signal that is, via line 51, coupled to the Requestor. Also at this time, the address of the addressable location in RAM 10 in which the correctable error was detected by ECC 30 is then stored in CAM 26 via the Correctable Read Data Error signal on lines 42 and 43.

The Requestor, in response to the Retry signal on line 51 ignores the erroneous uncorrected read data it receives from Interface Register 32 via line 33, and it initiates another memory reference using the same address when it is next granted priority. Upon the second try of the readout of the addressed data, ECC 30 corrects the read data and the corrected read data is then coupled to Interface Register 32 since a match now exists in the CAM and thence to the Requestor at the second relatively later gate pulse defining memory access time.

If upon the readout of the addressed data, ECC 30 detects uncorrectable read data, ECC 30, via line 40, couples an Uncorrectable Read Data Error signal to Data Parity Error Signal Generator 54 and thence to the Requestor via line 55. Upon receipt of the Data Parity Error signal on line 55, the Requestor may initiate any one of various possible recovery modes to overcome the effect of the receipt of the uncorrectable read data via Interface Register 32 and cable 33.

Figure 2A:
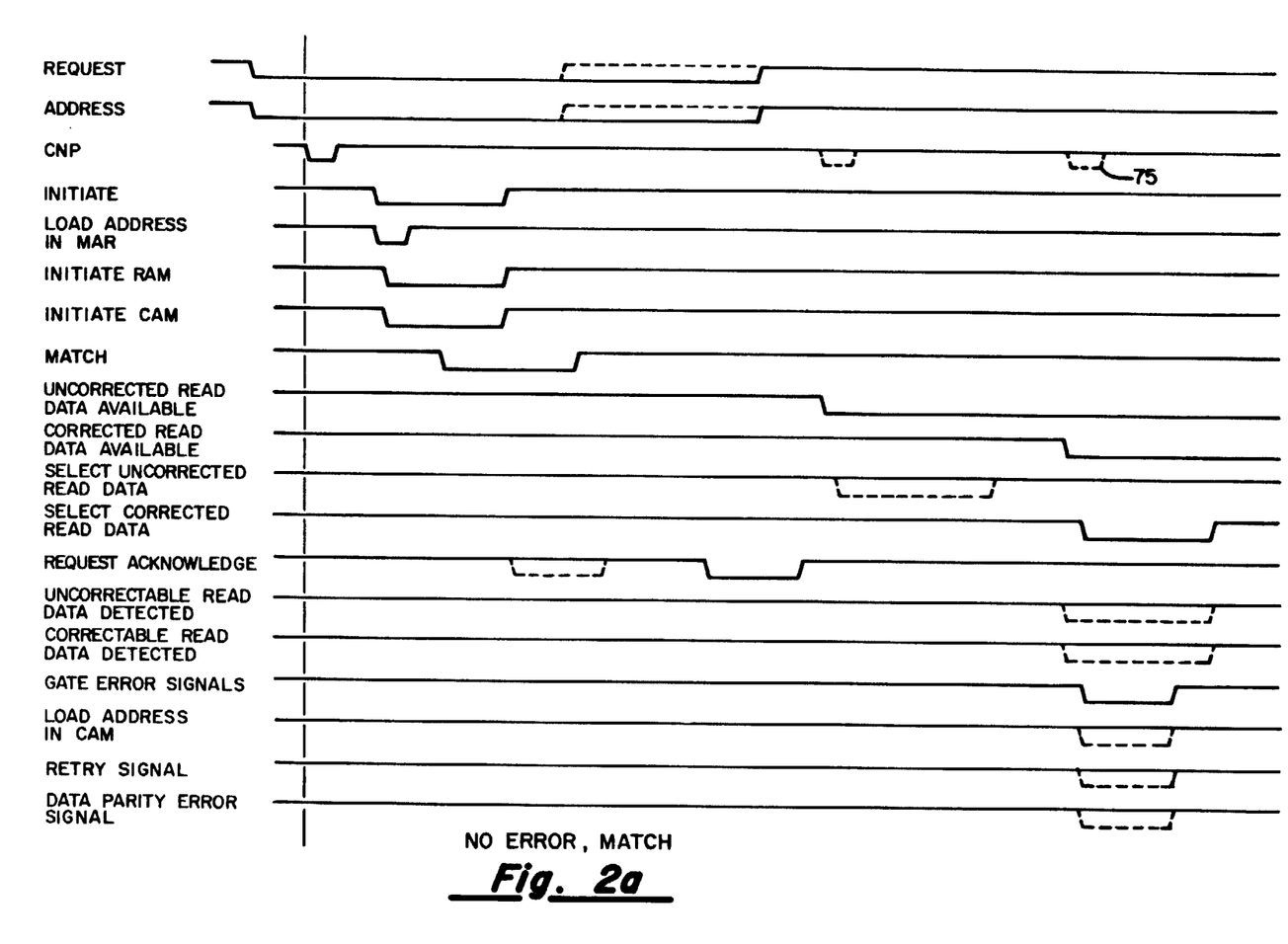
FIGS. 2a, 2b, 2c, 2d, 2e and 2f are exemplary timing diagrams associated with the memory system of FIG. 1.
Figure 2B:
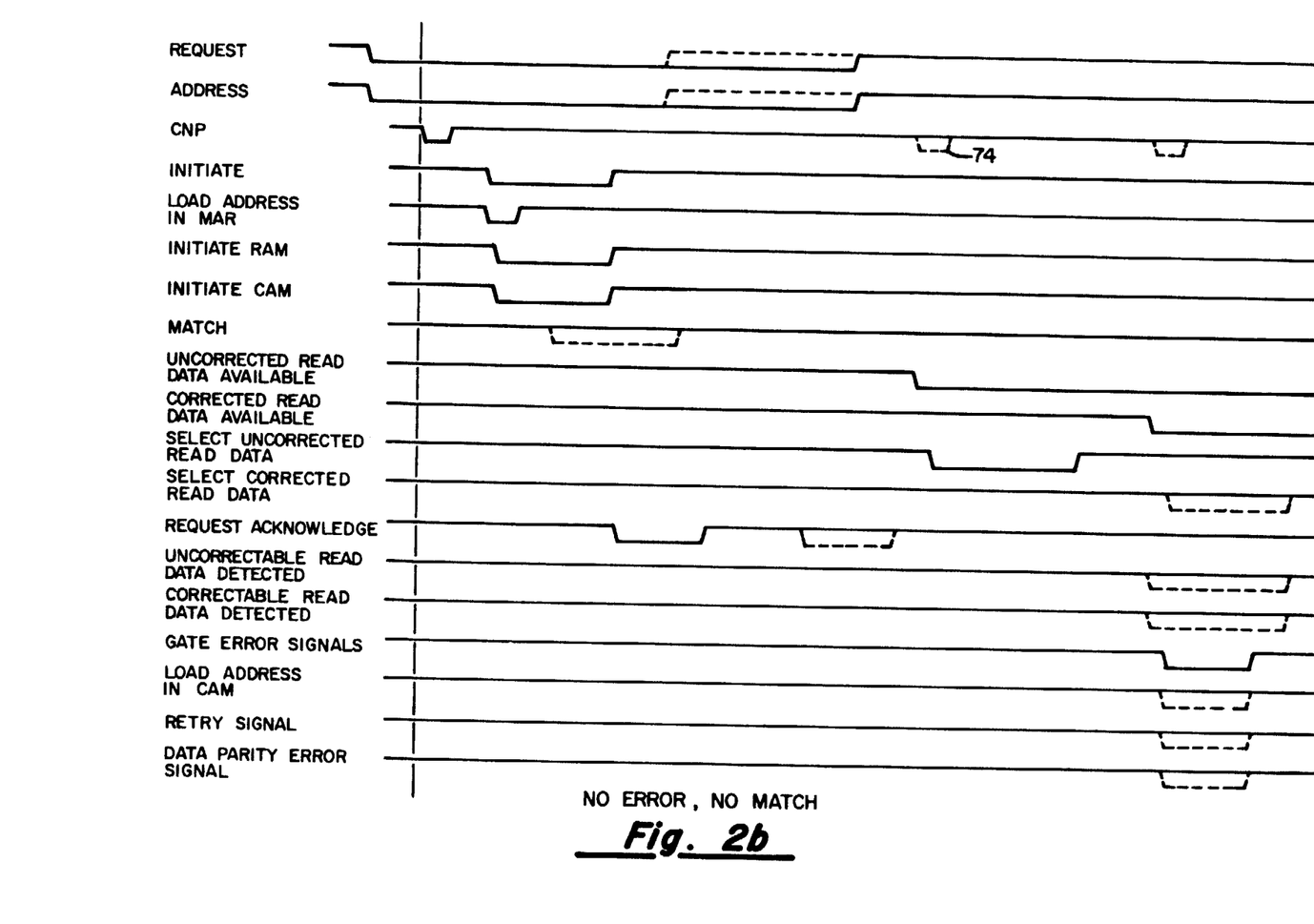
Figure 2C:
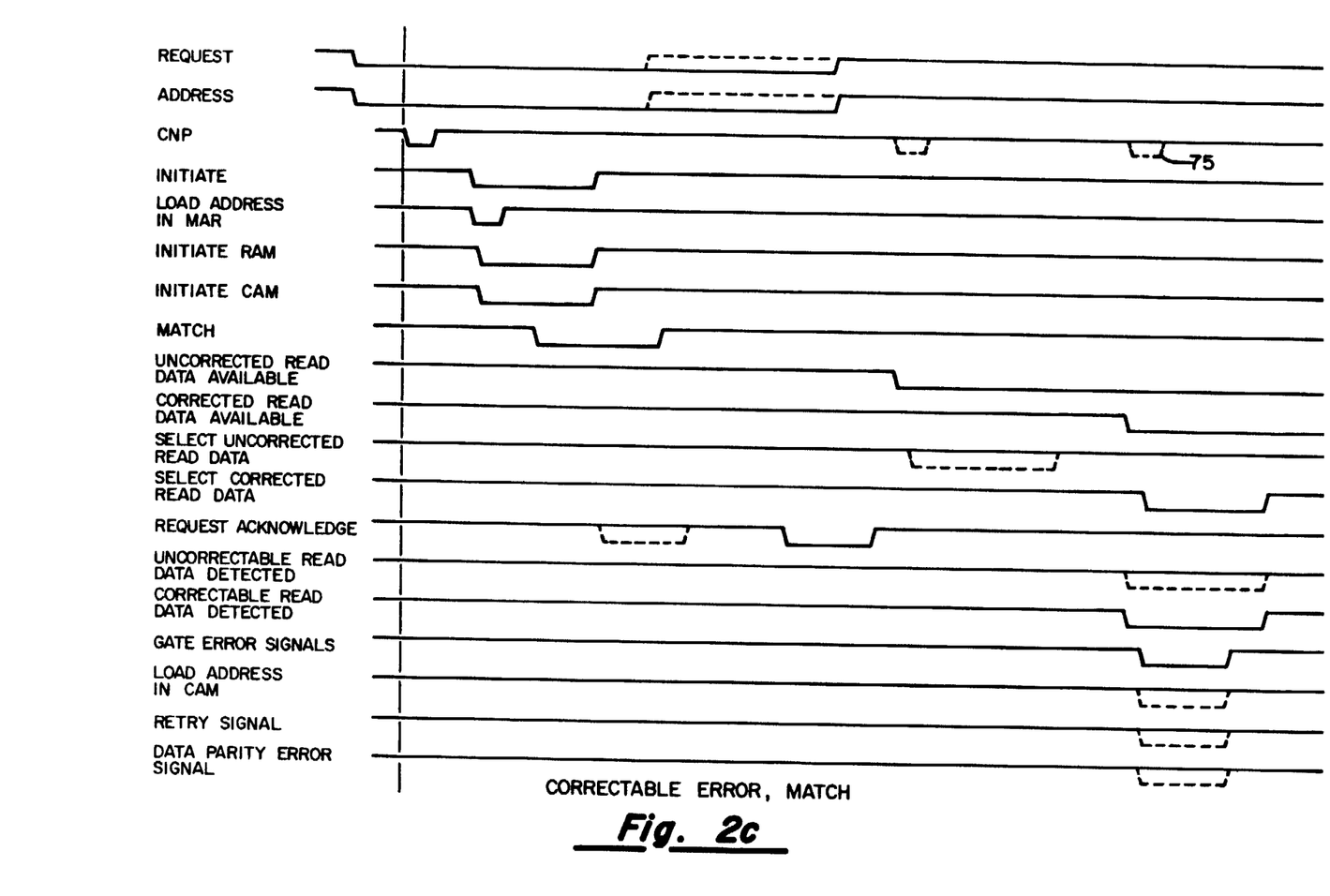
Figure 2D:
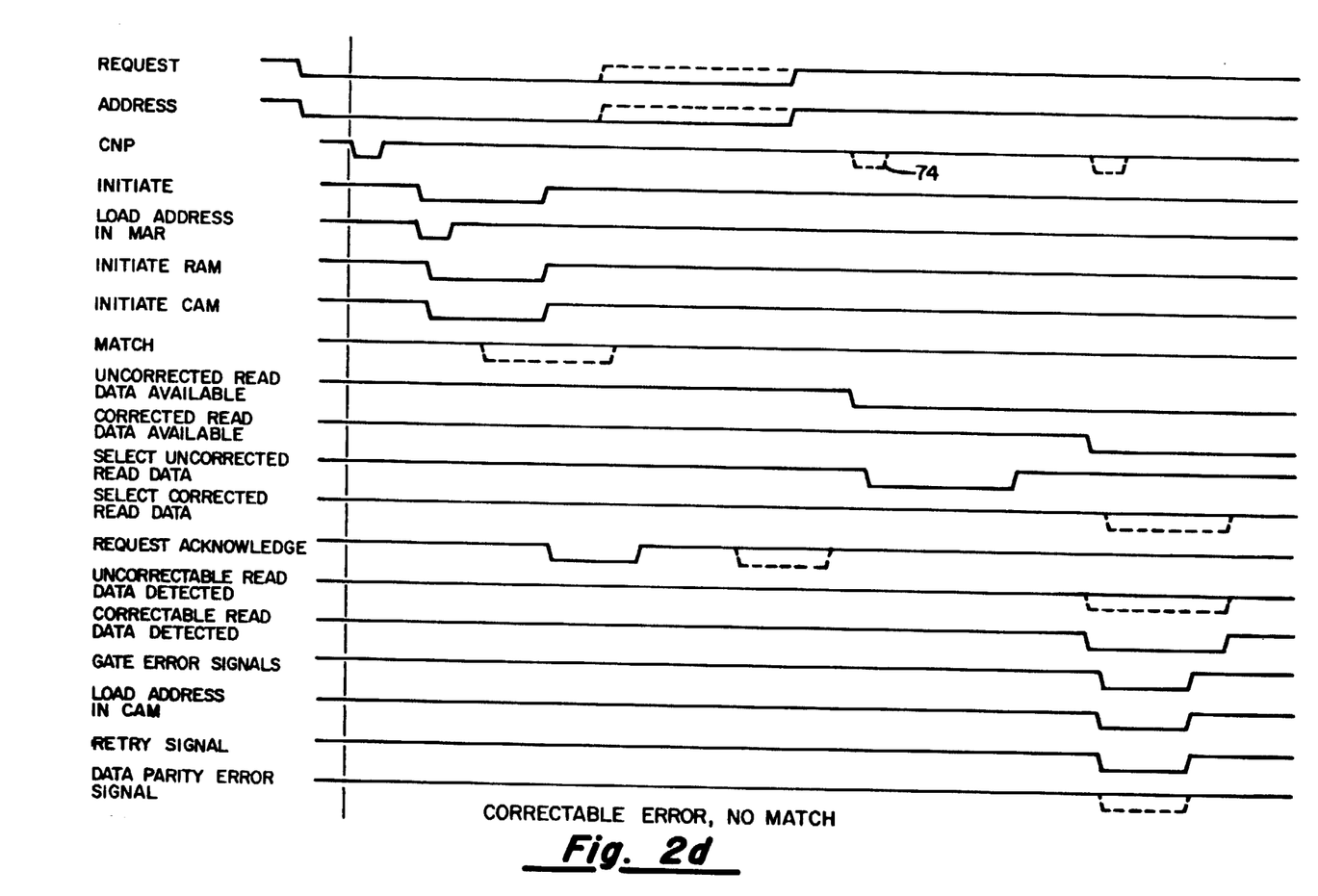
Figure 2E:
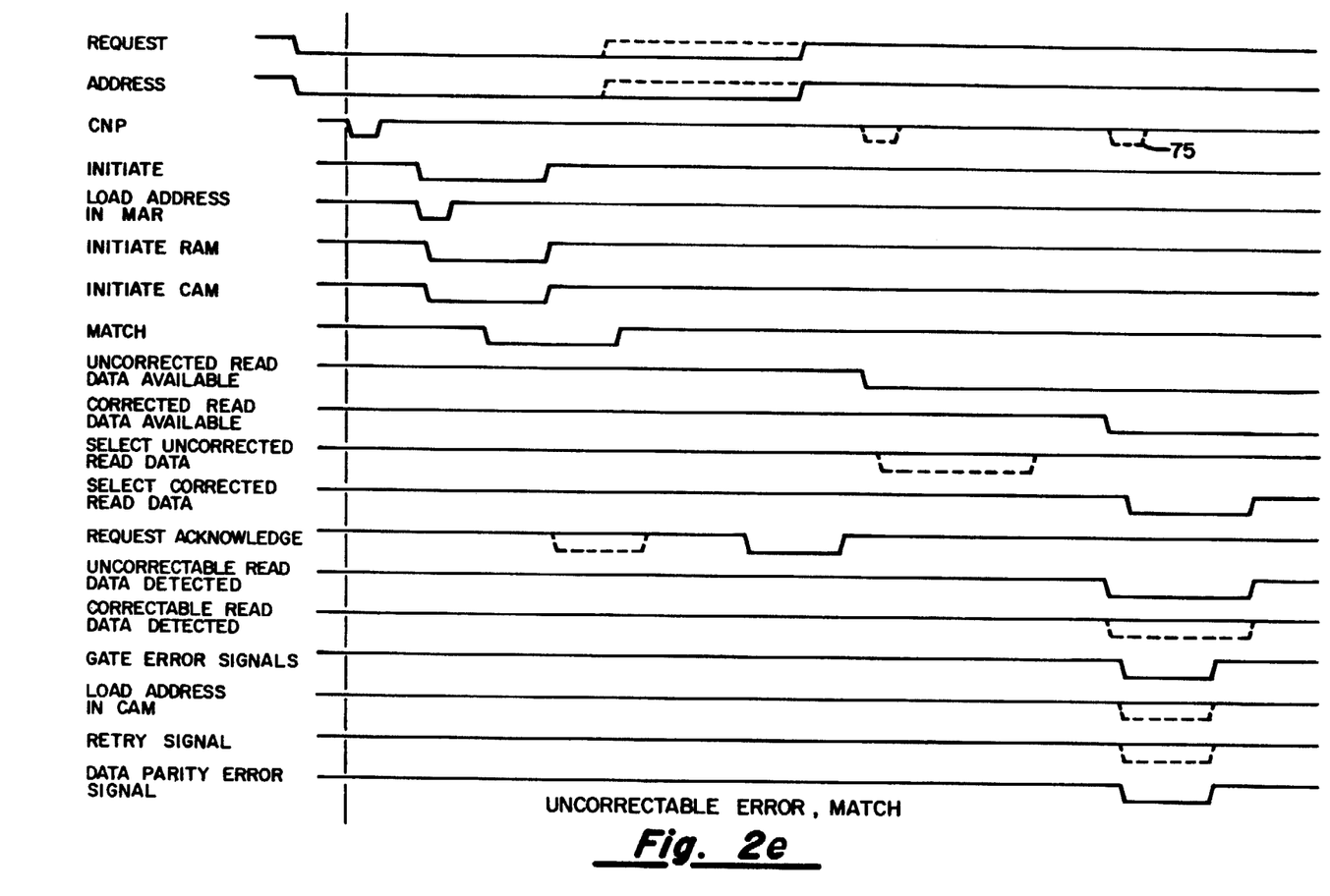
Figure 2F:
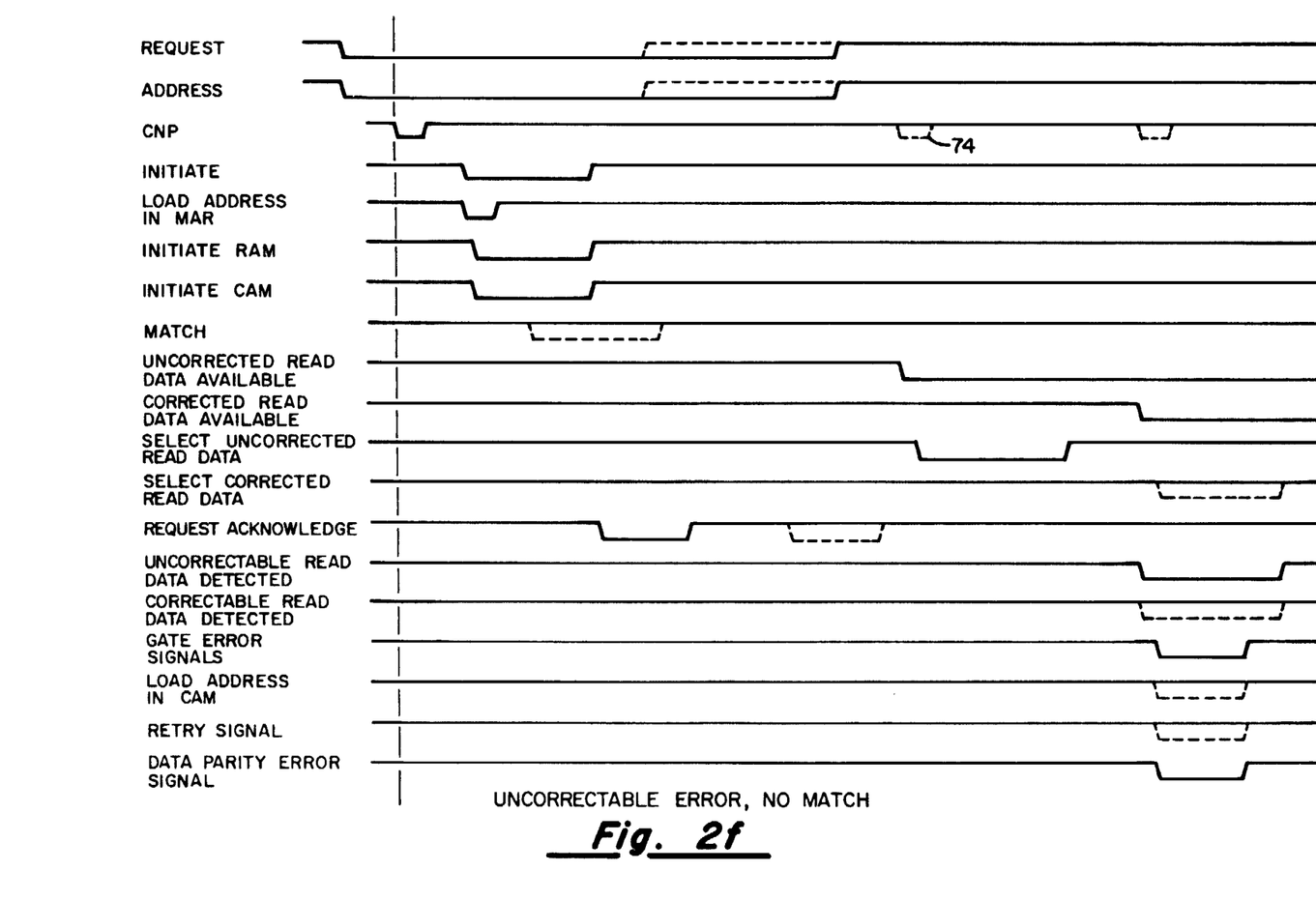
Figure 3:
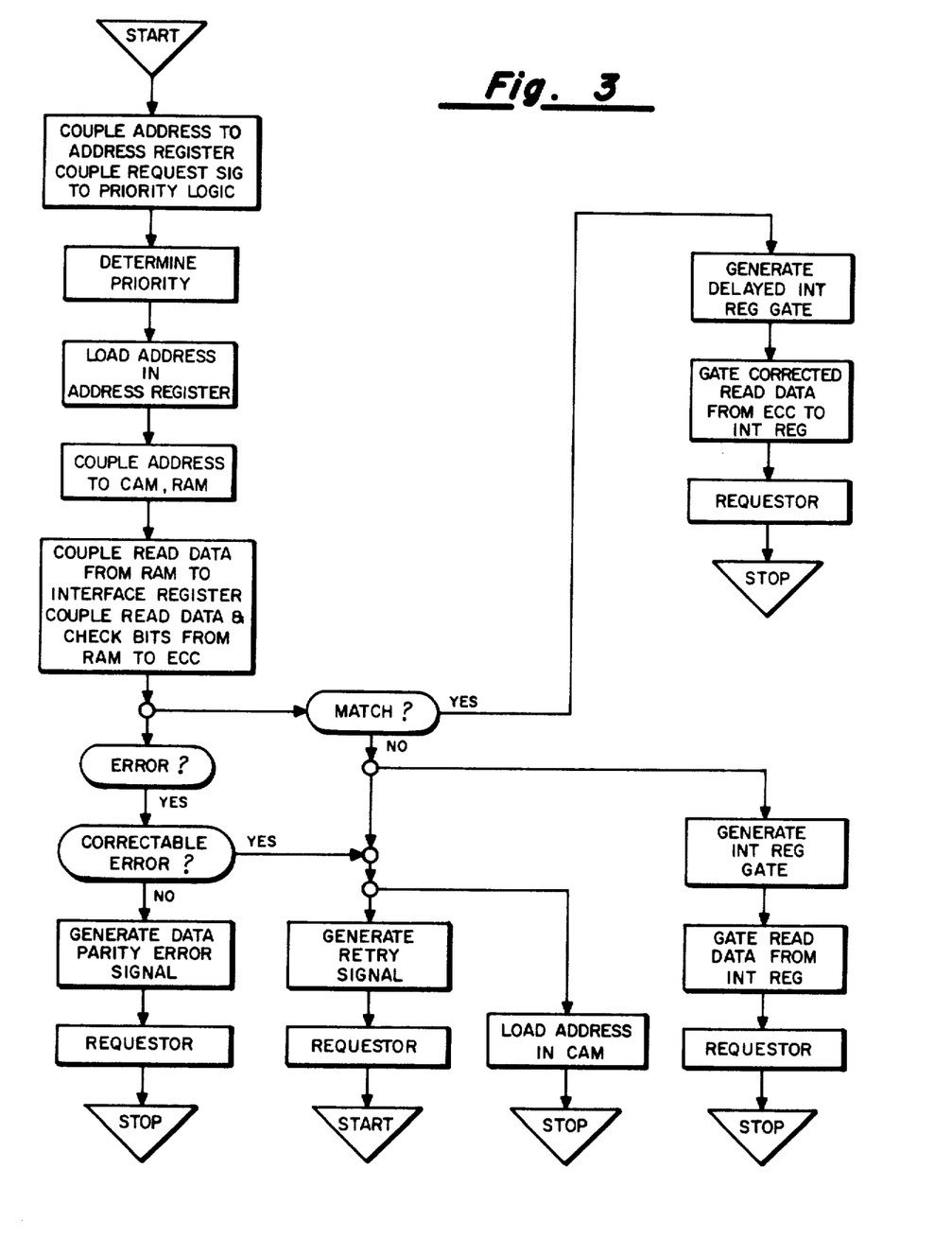
FIG. 3 is an illustration of a flow diagram of a functional description of the operation of the memory system of FIG. 1.

With particular reference to Table A, there is provided, in tabular form, the operation of the memory system of FIG. 1 functionally described by the flow chart of FIG. 3; each of the operating conditions of Table A are more explicitly described by the timing diagrams of FIGS. 2a, 2b, 2c, 2d, 2e and 2f.

TABLE A

| MATCH | | ERROR | | | DELAY INT REG GATE | | RETRY | | LOAD CAM | | DATA PARITY ERROR | | TIMING DIAGRAM |
|---|---|---|---|---|---|---|---|---|---|---|---|---|---|
| Y | N | N | C | U | Y | N | Y | N | Y | N | Y | N | |
| X | — | X | — | — | X | — | — | X | X | — | — | X | FIG. 2a |
| — | X | X | — | — | — | X | — | X | X | — | — | X | FIG. 2b |
| X | — | — | X | — | X | — | — | X | X | — | — | X | FIG. 2c |
| — | X | — | X | — | — | X | X | — | — | X | — | X | FIG. 2d |
| X | — | — | — | X | X | — | — | X | X | — | X | — | FIG. 2e |
| — | X | — | — | X | — | X | — | X | X | — | X | — | FIG. 2f |

Y → YES
N → NO
C → CORRECTABLE
U → UNCORRECTABLE

No Error, Match Condition

For the No Error, Match condition of FIG. 2a, the Requestors are concurrently coupling their Priority Request signals to Priority Logic 12 via cable 13 and their RAM addresses to MAR 14 via cable 15. When a CNP signal is subsequently coupled to Priority Logic 12 via line 16, the Requestor having the highest priority is granted priority providing, on its associated line of cable 22, the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 28 and the RAM word address is coupled to RAM 10 via cable 24. Next Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable locations of RAM 10 that have previously been stored in CAM 26 and in which addressable locations there have previously been determined to be correctable errors. Assuming a Match condition, i.e., that the address on line 28 matches an address previously stored in CAM 26, CAM 26 generates and couples to line 64 a Match signal. The Match signal on line 64:

via line 66 causes Controller 18 to generate a delayed gate interface register signal which on line 48 will couple to Interface Register 32 a Select Corrected Read Data signal;

via line 68 causes Controller 18 to generate a delayed Request Acknowledge Signal Generator 58 a delayed Request Acknowledge signal on line 59;

via line 52 couples an Inhibit Retry signal to Correctable Error Signal Generator 50, inhibiting the generation of a Retry signal on line 51;

via line 70 couples an Inhibit Load Address signal back to itself, inhibiting the loading of the address on cable 28 into one of the content addressable locations in CAM 26.

Also, at this time, upon receipt of the Initiate RAM signal on line 60, RAM 10 causes the uncorrected read data plus the associated check bits that are stored at the addressed addressable location in RAM 10, to be coupled to ECC 30 via cable 36 and causes the uncorrected read data to be coupled to Interface Register 32 via cable 34. Assuming no error in the read data, ECC 30 operates upon the uncorrected read data plus the check bits on cable 36 to generate and couple:

via line 38, the corrected read data to Interface Register 32.

The timing chain of Controller 18, after the time required for the corrected read data to be available on cable 38, generates and couples to Interface Register 32 via line 48, a Select Corrected Read Data signal (a delayed interface register gate signal). Also at approximately the same time, the timing chain of Controller 18 generates and couples to Uncorrectable Error Signal Generator 54 and to Correctable Error Signal Generator 50, via line 72, and to CAM 26, via line 73, a Gate Error Signals signal. As there is no Uncorrectable Read Data Error signal on line 40 nor a Correctable Read Data Error signal on line 42, but there is an Inhibit Load Address signal on line 70, no corresponding Data Parity Error signal or Retry signal are coupled to the Requestor via lines 55 and 51, respectively, nor is the group address on cable 28 stored at one of the content addressable locations in CAM 26. At this time the memory access sequence is completed and a new CNP signal may then be coupled to line 16 to initiate a new memory reference. Note that where memory overlap sequencing is utilized a new CNP signal may be initiated as of the time represented by the dashed CNP signal 75.

No Error, No Match Condition

For the No Error, No Match condition of FIG. 2b, the Requestors are concurrently coupling their Priority Request signals to Priority Logic 12 via cable 13 and their RAM addresses to MAR 14 via cable 15. When a CNP signal is subsequently coupled to Priority Logic 12 via line 16, the Requestor having the highest priority is granted priority providing on its associated line of cable 22 the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR signal to MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 26 and the RAM word address is coupled to RAM 10 via cable 24. Next Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable locations of RAM 10 that have previously been stored in CAM 26 and in which addressable locations there have previously been determined to be correctable errors. Assuming a No Match (Match) condition, i.e., that the address on line 28 does not match an address previously stored in CAM 26, CAM 26 generates and couples to line 64 a Match signal. The Match signal on line 64:

- via line 66 causes Controller 18 to generate an undelayed gate interface register signal which on line 46 will couple to Interface Register 32 a Select Uncorrected Read Data signal;
- via line 68 causes Controller 18 to generate an undelayed Request Acknowledge signal which on line 56 will couple to Request Acknowledge Signal Generator 58 an undelayed Request Acknowledge signal on line 59;
- via line 52 couples a Inhibit Retry signal to Correctable Error Signal Generator 50;
- via line 70 couples a Inhibit Load Address signal back to itself.

Also, at this time, upon receipt of the Initiate RAM signal on line 60, RAM 10 causes the uncorrected read data plus the associated check bits that are stored at the addressed addressable location in RAM 10, to be coupled to ECC 30 via cable 36 and causes the uncorrected read data to be coupled to Interface Register 32 via cable 34. Assuming no error in the read data, ECC 30 operates upon the uncorrected read data plus the check bits on cable 36 to generate and couple:

via line 38, the corrected read data to Interface Register 32.

The timing chain of Controller 18, after the time required for the uncorrected read data to be available on cable 38, generates and couples to Interface Register 32 via line 46, a Select Uncorrected Read Data signal (an undelayed interface register gate signal). Also at approximately the same time, the timing chain of Controller 18 generates and couples to Uncorrectable Error Signal Generator 54 and to Correctable Error Signal Generator 50, via line 72, and to CAM 26, via line 73, a Gate Error Signals signal. As there is no Uncorrectable Read Data Error signal on line 40 or a Correctable Read Data Error signal on line 42, but there is an Inhibit Load Address signal on line 70, no corresponding Data Parity Error signal or Retry signal are coupled to the Requestor via lines 55 and 51, respectively, nor is the group address on cable 29 stored at one of the content addressable locations in CAM 26. At this time the memory access sequence is completed and a new CNP signal may then be coupled to line 16 to initiate a new memory reference. Note that where memory overlap sequencing is utilized a new CNP signal may be initiated as of the time represented by the dashed CNP signal 74.

Correctable Error, Match Condition

For the Correctable Error, Match condition of FIG. 2c, the Requestors are concurrently coupling their priority request signals to Priority Logic 12 via cable 13 and their RAM addresses to MAR 14 via cable 15. When a CNP signal is subsequently coupled to Priority Logic 12 via line 16, the Requestor having the highest priority is granted priority providing on its associated line of cable 22 the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR signal to MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 28 and the RAM word address is coupled to RAM 10 via cable 24. Next, Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable locations of RAM 10 that have previously been stored in CAM 18 and in which addressable locations there have previously been determined to be correctable errors. Assuming a Match condition, CAM 26 generates and couples to line 64 a Match signal. The Match signal on line 64:

- via line 66 causes Controller 18 to generate a delayed gate interface register signal which on line 48 will couple to Interface Register 32 a Select Corrected Read Data signal;
- via line 68 causes Controller 18 to generate a delayed Request Acknowledge signal which on line 56 will couple to Request Acknowledge Signal Generator 58 a delayed Request Acknowledge signal on line 59;
- via line 52 couples an Inhibit Retry signal to Correctable Error Signal Generator 50, inhibiting the generation of a Retry signal on line 51;
- via line 70 couples an Inhibit Load Address signal back to itself, inhibiting the loading of the address on cable 28 into one of the content addressable locations in CAM 28.

Also, at this time, upon receipt of the Initiate RAM signal on line 60, RAM 10 causes the uncorrected read data plus the associated check bits that are stored at the addressed addressable location in RAM 10, to be coupled to ECC 30 via cable 36 and causes the uncorrected read data to be coupled to Interface Register 32 via cable 34. Assuming a correctable error in the read data, ECC 30 operates upon the uncorrected read data plus the check bits on cable 36 to generate and couple:

via line 42, a Correctable Read Data Error signal to Correctable Error Signal Generator 50;

to cable 44 the six (6) syndrome bits that identifies the one bit plane group out of 45 bit plane groups that the correctable error lies;

via line 38, the corrected read data to Interface Register 32.

The timing chain of Controller 18, after the time required for the corrected read data to be available on cable 38, generates and couples to Interface Register 32 via line 48, a Select Corrected Read Data signal (a delayed interface register gate signal). Also at approximately the same time, the timing chain of Controller 18 generates and couples to Uncorrectable Read Data Error Signal Generator 50, via line 72, and to CAM 26, via line 73, a Gate Error Signals signal. As there is no Uncorrectable Read Data Error signal on line 40 but there is a Correctable Read Data Error signal on line 42, and an Inhibit Load Address signal on line 70, no corresponding Data Parity Error signal or a Retry signal is coupled to the Requestor via lines 55 and 51, respectively, while the group address on cable 28 is not stored at one of the content addressable locations in CAM 26. At this time the memory access sequence is completed and a new CNP signal may then be coupled to line 16 to initiate a new memory reference. Note that where memory overlap sequencing is utilized a new CNP signal may be initiated as of the time represented by the dashed CNP signal 75.

Correctable Error, No Match Condition

For the Correctable Error, No Match condition of FIG. 2d, the Requestors are concurrently coupling their priority request signals to Priority Logic 12 via cable 13 and their RAM addresses to MAR 14 via cable 15. When a CNP signal is subsequently coupled to Priority Logic 12 via line 16, the Requestor having the highest priority is granted priority providing on its associated line of cable 22 the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR signal to MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 28 and the RAM word address is coupled to RAM 10 via cable 24. Next Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable locations of RAM 10 which have previously been stored in CAM 18 and in which addressable locations there have previously been determined to be correctable errors. Assuming a $\overline{\text{Match}}$ condition, CAM 26 generates and couples to line 64 a $\overline{\text{Match}}$ signal. The $\overline{\text{Match}}$ signal on line 64:

via line 66 causes Controller 18 to generate an undelayed gate interface register signal which on line 46 will couple to Interface Register 32 a Select Uncorrected Read Data signal;

via line 68 causes Controller 18 to generate an undelayed Request Acknowledge signal which on line 56 will couple to Request Acknowledge Signal Generator 58 an undelayed Request Acknowledge signal on line 59;

via line 52 couples a $\overline{\text{Inhibit Retry}}$ signal to Correctable Error Signal Generator 50, causing the generation of a Retry signal on line 51 when the Gate Error Signals signal is subsequently coupled to line 72;

via line 70 couples a $\overline{\text{Inhibit Load Address}}$ signal back to itself, causing the loading of the address on cable 28 into one of the content addressable locations in CAM 26 when the Gate Error Signals signal is subsequently coupled to line 72.

Also, at this time, upon receipt of the Initiate RAM signal on line 60, RAM 10 causes the uncorrected read data plus the associated check bits that are stored at the addressed addressable location in RAM 10, to be coupled to ECC 30 via cable 36 and causes the uncorrected read data to be coupled to Interface Register 32 via cable 34. Assuming a correctable error in the read data, ECC 30 operates upon the uncorrected read data plus the check bits on cable 36 to generate and couple:

via line 42, a correctable Read Data Error signal to Correctable Error Signal Generator 50;

to cable 44 the six (6) syndrome bits that identify the one bit plane group out of 45 bit plane groups that the correctable error lies;

via line 38, the corrected read data to Interface Register 32.

The timing chain of Controller 18, after the time required for the uncorrected read data to be available on cable 38, generates and couples to Interface Register 32 via line 46, a Select Uncorrected Read Data signal (an undelayed interface register gate signal). Also at approximately the same time, the timing chain of Controller 18 generates and couples to Uncorrectable Error Signal Generator 54 and to Correctable Errors Signal Generator 50, via line 72, and to CAM 26, via line 73, a Gate Error Signals signal. As there is no Uncorrectable Read Data Error signal on line 40 but there is a Correctable Read Data Error signal on line 42, and an Inhibit Load Address signal on line 70 no corresponding Data Parity Error signal but a Retry signal are coupled to the Requestor via lines 55 and 51, respectively, while the group address on cable 28 is stored at one of the content addressable locations in CAM 26. At this time the memory access sequence is completed and a new CNP signal may be coupled to line 16 to initiate a new memory reference. Note that where memory overlap sequencing is utilized a new CNP signal may be initiated as of the time represented by the dashed CNP signal 74.

Uncorrectable Error, Match Condition

For the Uncorrectable Error, Match condition of FIG. 2e, the Requestors are concurrently coupling their priority request signals to Priority Logic 12 via cable 13 and their RAM addresses to MAR 14 via cable 15. When a CNP signal is subsequently coupled to Priority Logic 12 via line 16, the Requestor having the highest priority is granted priority providing on its associated line of cable 22 the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR signal to MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 28 and the RAM word address is coupled to RAM 10 via cable 24. Next Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable locations of RAM 10 that have previously been stored in CAM 18 and in which addressable locations there have previously been determined to be correctable errors. Assuming a Match condition, CAM 26 generates and couples to line 64 a Match signal. The Match signal on line 64:

- via line 66 causes Controller 18 to generate a delayed gate interface register signal which on line 48 will couple to Interface Register 32 a Select Corrected Read Data signal;
- via line 68 causes Controller 18 to generate a delayed Request Acknowledge signal which on line 56 will couple to Request Acknowledge generator 58 a delayed Request Acknowledge signal on line 59;
- via line 52 couples an Inhibit Retry signal to Correctable Error Signal Generator 50, inhibiting the generation of a Retry signal on line 51;
- via line 70 couples an Inhibit Load Address signal back to itself, inhibiting the loading of the address on cable 28 into one of the content addressable locations in CAM 26.

Also, at this time, upon receipt of the Initiate RAM signal on line 60, RAM 10 causes the uncorrected read data plus the associated check bits that are stored at the address addressable location in RAM 10, to be coupled to ECC 30 via cable 36 and causes the uncorrected read data to be coupled to Interface Register 32 via cable 34. Assuming an uncorrectable error in the read data, ECC 30 operates upon the uncorrected read data plus the check bits on cable 36 to generate and couple:

via line 38, the uncorrectable read data to Interface Register 32.

The timing chain of Controller 18, after the time required for the corrected read data to be available on cable 38, generates and couples to Interface Register 32 via line 43, a Select Corrected Read Data signal (a delayed interface register gate signal). Also at approximately the same time, the timing chain of Controller 18 generates and couples to Uncorrectable Error Signal Generator 54 and to Correctable Error Signal Generator 50, via line 72, and to CAM 26, via line 73, a Gate Error Signals signal. As there is an Uncorrectable Read Data Error signal on line 40, no Correctable Read Data Error signal on line 42, but an Inhibit Load Address signal on line 70, a corresponding Data Parity Error signal but no Retry signal are coupled to the Requestor via lines 55 and 51, respectively, while the group address on cable 28 is not stored at one of the content addressable locations in CAM 26. At this time the memory access sequence is completed and a new CNP signal may then be coupled to line 16 to initiate a new memory reference. Note that where memory overlap sequencing is utilized a new CNP signal may be initiated as of the time represented by the dashed CNP signal 75.

Uncorrectable Error, No Match Condition

For the Uncorrectable Error, No Match condition of FIG. 2f, the Requestors are concurrently coupling their priority request signals to Priority Logic 12 via cable 13 and their RAM addresses to MAR 14 via cable 15. When a CNP signal is subsequently coupled to Priority Logic 12 via line 16, the Requestor having the highest priority is granted priority providing on its associated line of cable 22 the signal that couples its associated RAM address into MAR 14.

After the determination of priority by Priority Logic 12, Priority Logic 12 couples, via line 20, an Initiate signal to Controller 18 which Initiate signal starts the timing chain that controls the operation of the memory system of FIG. 1. Controller 18, via line 61, next couples a Load Address In MAR signal to MAR 14, gating the address that is associated with the Requestor that was granted priority into MAR 14. The Load Address In MAR signal causes the address now loaded in MAR 14 to be coupled to cable 23 whereby the RAM group address is coupled to CAM 26 via cable 28 and the RAM word address is coupled to RAM 10 via cable 24. Next Controller 18 generates and couples:

to RAM 10, via line 60, an Initiate RAM signal;
to CAM 26, via line 62, an Initiate CAM signal.

Upon receipt of the Initiate CAM signal, CAM 26 compares the group address on line 28 to the addresses of the addressable location of RAM 10 which have previously been stored in CAM 18 and in which addressable locations there have previously been determined to be correctable errors. Assuming a Match, CAM 18 generates and couples to line 64 a Match signal. The Match signal on line 64:

- via line 66 causes Controller 18 to generate an undelayed gate interface register signal which on line 46 will couple to Interface Register 32 a Select Uncorrected Read Data signal;
- via line 68 causes Controller 18 to generate an undelayed Request Acknowledge signal which on line 56 will couple to Request Acknowledge Signal Generator 58 an undelayed Request Acknowledge signal on line 59;
- via line 52 couples a Inhibit Retry signal to Correctable Error Signal Generator 50;
- via line 70 couples a Inhibit Load Address signal back to itself.

Also, at this time, upon receipt of the Initiate RAM signal on line 60, RAM 10 causes the uncorrected read data plus the associated check bits that are stored at the addressable location in RAM 10, to be coupled to ECC 30 via cable 36 and causes the uncorrected read data to be coupled to Interface Register 32 via cable 34. Assuming an uncorrectable error in the read data, ECC 30 operates upon the uncorrected read data plus the check bits on cable 36 to generate and couple:

via line 40, an Uncorrectable Read Data Error signal to Uncorrectable Error Signal Generator 54;
via line 38, the Uncorrectable read data to Interface Register 32.

The timing chain of Controller 18, after the time required for the uncorrected read data to be available on cable 38, generates and couples to Interface Register 32 via line 46, a Selected Uncorrected Read Data signal (an undelayed interface register gate signal). Also at approximately the same time, the timing chain of Controller 18 generates and couples to Uncorrectable Error Signal Generator 54 and to Correctable Error Signal Generator 50, via line 72, and to CAM 26, via line 73, a Gate Error Signals signal. As there is an Uncorrectable Read Data Error signal on line 40, no Correctable Read Data Error signal on line 42, but there is a Load Address signal on line 43, a corresponding Data Parity Error signal but no Retry signal are coupled to the Requestor via lines 55 and 51, respectively, while the group address on cable 28 is not stored at one of the content addressable locations in CAM 26. At this time the memory access sequence is completed and a new CNP signal may then be coupled to line 16 to initiate a new memory reference. Note that where memory overlap sequencing is utilized a new CNP signal may be initiated as of the time represented by the dashed CNP signal 74.

What is claimed is:

1. A method of conditionally bypassing the error correction circuitry of an error correcting memory system, comprising:
   reading out the uncorrected read bits that are stored in a memory;
   determining if said read out uncorrected read bits had or had not been previously corrected;
   coupling said uncorrected read bits to error correction circuitry;
   generating corrected read bits from said uncorrected read bits;
   coupling said uncorrected read bits to gating means;
   coupling said corrected read bits to said gating means;
   gating said uncorrected read bits from said gating means at a relatively fast memory access time if said uncorrected read bits had not been previously corrected or, alternatively, gating said corrected read bits from said gating means at a relatively slow memory access time if said uncorrected read bits had been previously corrected.

2. A method of conditionally bypassing the error correction circuitry of an error correcting system, comprising:
   coupling a memory address to a first memory;
   reading out the uncorrected read bits that are stored at the addressed addressable location in said first memory;
   coupling said memory address to a second memory;
   determining if said memory address is stored in said second memory;
   generating a Match signal if said memory address is stored in said second memory or, alternatively, generating a $\overline{\text{Match}}$ signal if said memory address is not stored in said second memory;
   coupling said uncorrected read bits to error correction circuitry;
   generating corrected read bits from said uncorrected read bits;
   coupling said uncorrected read bits to gating means;
   coupling said corrected read bits to said gating means;
   gating said uncorrected read bits from said gating means in response to said $\overline{\text{Match}}$ signal at a relatively fast memory access time or, alternatively, gating said corrected read bits from said gating means in response to said Match signal at a relatively slow memory access time.

3. A method of conditionally bypassing the error correction circuitry of an error correcting memory system, comprising:
   coupling a multibit memory address to an addressable memory;
   reading out the uncorrected read bits that are stored at the addressed addressable location in said addressable memory;
   coupling said multibit memory address to a content addressable memory;
   determining if said multibit memory address is stored in said content addressable memory;
   generating a Match signal if said multibit memory address is stored in said content addressable memory or, alternatively, generating a $\overline{\text{Match}}$ signal if said multibit memory address is not stored in said content addressable memory;
   coupling said uncorrected read bits to error correction circuitry;
   generating corrected read bits from said uncorrected read bits;
   coupling said uncorrected read bits to interface registers;
   coupling said corrected read bits to said interface registers;
   gating said uncorrected read bits from said interface registers in response to said $\overline{\text{Match}}$ signal at a relatively fast memory access time or, alternatively, gating said corrected read bits from said interface registers in response to said Match signal at a relatively slow memory access time.

* * * * *

UNITED STATES PATENT AND TRADEMARK OFFICE
CERTIFICATE OF CORRECTION

PATENT NO. : 4,112,502
DATED : September 5, 1978
INVENTOR(S) : JAMES HERMAN SCHEUNEMAN It is certified that error appears in the above-identified patent and that said Letters Patent are hereby corrected as shown below:

Column 14, Claim 2, Line 1, "Match" should be -- $\overline{\text{Match}}$ --.

Signed and Sealed this

Sixth Day of March 1979

[SEAL]

Attest:

RUTH C. MASON
*Attesting Officer*

DONALD W. BANNER
*Commissioner of Patents and Trademarks*